United States Patent [19]

Harner et al.

[11] 4,435,647
[45] Mar. 6, 1984

[54] PREDICTED MOTION WIND TURBINE TOWER DAMPING

[75] Inventors: Kermit I. Harner, Windsor; John P. Patrick, South Windsor, both of Conn.; Joseph M. Kos, Holyoke, Mass.

[73] Assignee: United Technologies Corporation, Hartford, Conn.

[21] Appl. No.: 364,707

[22] Filed: Apr. 2, 1982

[51] Int. Cl.³ .................. F03D 9/00; F03D 7/04
[52] U.S. Cl. .................. 290/44; 290/55; 416/30; 416/35; 416/41; 416/43
[58] Field of Search ............ 290/44, 55; 416/30, 416/35, 41, 43

[56] References Cited

U.S. PATENT DOCUMENTS

| | | | |
|---|---|---|---|
| 4,160,170 | 7/1979 | Harner et al. | 290/44 |
| 4,161,658 | 7/1979 | Patrick | 290/44 |
| 4,189,648 | 2/1980 | Harner | 290/44 |
| 4,193,005 | 3/1980 | Kos et al. | 290/55 X |

Primary Examiner—J. V. Truhe
Assistant Examiner—Terry Flower
Attorney, Agent, or Firm—M. P. Williams

[57] ABSTRACT

Damping of the primary bending mode of a tower (12) mounting a wind turbine having a control (36) for providing a pitch blade angle reference signal (40) to modulate the pitch of the turbine blades (1) through a pitch change mechanism (38) for constant power is provided by generating the pitch blade angle reference signal as the integral (104) of the summation (266) of a torque/-power controlling blade pitch angle reference rate signal (98) with an estimated acceleration signal (255) generated by filtering (250, 252, 254) the blade pitch angle reference signal (40) with the following transfer function $$\frac{(KA)S^2}{\overline{K}\{(TA)S + 1\}\{(\overline{M}/K)S^2 + (\overline{D}/K)S + 1\}}$$

3 Claims, 2 Drawing Figures

PREDICTED MOTION WIND TURBINE TOWER DAMPING

DESCRIPTION

1. Technical Field

This invention relates to tower-mounted wind turbine electric power generating systems, and more particularly to damping the tower primary resonant frequency while modulating the rotor blade angle to maintain rated torque or power.

2. Background Art

The use of wind as a low cost source of electrical energy has the obvious drawback of being dependent upon wind conditions. To make a wind turbine electric generating system both useful and economically viable, it is necessary to ensure operation of the wind turbine over a wide range of wind conditions and over the largest fraction of time possible. Therefore, wind turbines are typically located (sometimes in clusters called "wind energy farms") where the prevailing wind conditions are relatively favorable; that is, where there is sufficient velocity over a rather large portion of the time. However, when the wind is of sufficient strength for useful electric power generation, it is usually gusty during a significant fraction of the time.

For efficient wind generation, very large blades (pairs of blades totaling on the order of 30 to 100 meters in length) are mounted at the top of very tall towers (such as between 30 meters and 90 meters in length). Because the wind turbine is connected directly to the electric generator and power system (albeit through gearing and resilient coupling shafts), maintaining the desired level of electrical power output (so that it can contribute to the total energy supplied to an electric distribution grid) requires modulating blade angle to accommodate the effects of unpredictable wind gusts and turbulence on the power developed by the wind turbine. Therefore, systems have been provided to monitor either the desired rotor shaft torque of the wind turbine rotor, or the power generated by the generator and to utilize variations in either of these factors to modulate the pitch angle of the rotor blades in such a fashion so as to maintain rated power for wind speeds at and above the rated wind velocity. Because the torque and power are directly related by the rotary speed of the generator, these terms are used interchangeably herein and are referred to alternatively as torque/power. Maximum effect is when the blades have low pitch (the blade surfaces are essentially perpendicular to the rotor shaft), and minimum effect occurs when the blades are at maximum angle of approximately 90° (the surfaces are basically parallel to the rotor shaft), which is referred to as being "feathered". A blade angle control system of this type is disclosed in our U.S. Pat. No. 4,193,005.

A tall wind turbine support tower, with very large blades, shafts and gearing, electric generating equipment, and miscellaneous control and protective equipment disposed at the top thereof, is necessarily a cantilevered mass, having a stiffness constant and a structural damping ratio. Any force will excite the primary tower resonance.

The thrust on the blades (caused by the wind acting on the blades parallel to the rotary axis of the wind turbine rotor) is a force which tends to accelerate the wind turbine equipment in the direction of the wind. The top of the wind turbine tower therefore assumes (in steady state conditions) a position where the thrust force is balanced by the stress force developed in the tower structure, depending on tower stiffness. If the wind velocity changes (a gust), this alters the net force on the equipment at the top of the tower and causes the tower to sway back and forth (oscillate) in a direction parallel with the wind force. When the wind velocity is below that which will produce rated power, the rotor blade angle may be fixed, or it may be modulated slightly to optimize energy capture as wind velocity changes. With a fixed (or nearly constant) blade angle, the thrust (longitudinal wind force) on the blades will increase with increasing wind velocity in all cases, and therefore any motion of the top of the tower will provide positive aerodynamic damping to the tower (in the same sense as the tower structural damping). In such case, the oscillation of the tower in its primary bending mode, in response to an incremental force due to a wind gust, will damp out, and be of little concern. Above rated wind speed (that which will produce rated power), the power control reacts to power or torque variations caused by wind gusts or turbulence to adjust (modulate) the rotor blade angle in a manner to tend to maintain power or torque constant. As wind velocity increases, if power is held constant, thrust inherently decreases. Thus, blade modulation, in response to a gust, to maintain constant power, inherently results in an opposite incremental thrust, which is therefore in a direction to provide negative aerodynamic damping to the tower. This negative damping subtracts from the tower structural damping and results in increased tower oscillations. In wind turbines designed for maximum wind energy capture and close power control, the negative damping may exceed the structural damping during power-controlled operation. This yields a net negative damping on the tower so the tower becomes unstable (tower motion increases with each cycle thereof at the primary tower resonant frequency). In fact, detailed analysis has shown that interaction between the tower and the torque/power control can result in severe degradation of tower fatigue life, from several tens of years to on the order of a few years.

Initial consideration of the problem may bring to mind and utilization of notch filter, to severely curtail blade angle correction at a blade angle command frequency relating to the first bending mode frequency of the tower and its apparatus. However, this approach results in large transient errors in power generated, because of a reduction in the response characteristics of the power control loop. It has also been suggested that a blade angle pitch change rate could be augmented on a signal taken from tower bending to provide effective damping on the tower; however, nothing has come of such suggestion.

DISCLOSURE OF INVENTION

Objects of the invention include providing additional positive damping to a wind turbine tower while allowing a power control to modulate blade angle to minimize torque or power fluctuations resulting from wind turbulence.

In accordance with the present invention, a wind turbine powered electric generating system, having a control to modulate rotor blade angle to maintain rated torque or power in turbulent wind, disposed at the top of a tower, provides a blade angle command component which will adjust the turbine rotor blade angle in a manner to provide positive aerodynamic damping of the tower in response to a predicted motion signal indicative of analytically anticipated longitudinal motion of the tower parallel to the rotor axis as a filtered function of the blade angle reference signal.

In further accord with the present invention, the additional positive damping is provided by a blade angle reference signal component related to the blade angle reference signal by the transfer function $$\frac{KA\ S}{\overline{K}\{(TA)S + 1\}\{(\overline{M}/\overline{K})S^2 + (\overline{D}/\overline{K})S + 1\}},$$

where KA is the desired gain, TA approximates the lag of the blade pitch angle mechanism, and $\overline{K}$, $\overline{M}$, $\overline{D}$ are calculated, approximate values of stiffness, mass and damping factor of the wind turbine tower, respectively.

The invention may be implemented in an analog fashion or it may be implemented in a digital fashion, either with dedicated digital hardware or as software in a suitable computer, such as a microprocessor.

The invention provides a significant reduction in primary bending mode response of a wind turbine tower due to coupling between the tower and the blade angle control system related thereto, with a minimum impact on power generation performance. The invention is readily implemented without additional dynamic elements at the top of the control tower, by means of a simple addition of circuitry or a simple change in the program of a computer which controls blade angle.

The foregoing and other objects, features and advantages of the present invention will become more apparent in the light of the following detailed description of exemplary embodiments thereof, as illustrated in the accompanying drawings.

BEST MODE FOR CARRYING OUT THE INVENTION

Figure 1:
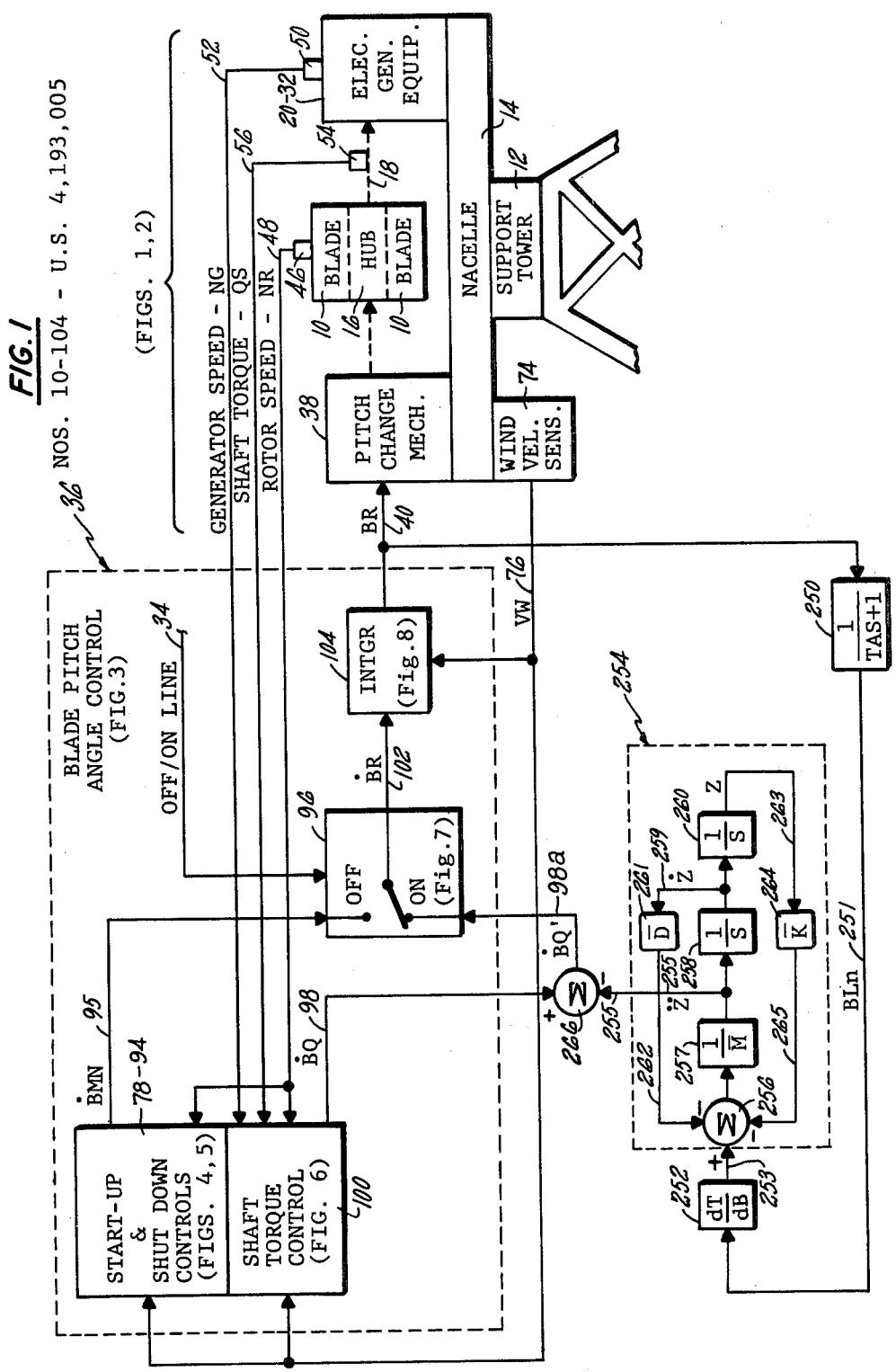
FIG. 1 is a simplified schematic block diagram of a wind turbine including a blade pitch angle control system having an embodiment of the invention incorporated therewith.

An exemplary embodiment of the present invention is disclosed as it may be implemented in a multi-mode control system for wind turbines of the type disclosed in the aforementioned U.S. Pat. No. 4,193,005. A general description of the control system disclosed in said patent is first given with respect to reference numbers 10-104 in the drawing herein, which are the same as those in said patent; the parenthetical reference to figure numbers are to figures of said patent. Thereafter, the tower/control interaction problem is analyzed and embodiments of the invention are described.

Referring now to the drawing, a representative wind turbine construction consists of two diametrically opposed identical rotor blades 10, typically totaling between 30 meters and 100 meters in length, mounted on a support tower 12. The mechanical components, control devices and electrical generating equipment which comprise the wind turbine are contained in a nacelle 14 supported by the tower 12. The construction of wind turbines and accessory equipment therefor, such as yaw controls for orienting the blades into the prevailing wind, are all well known and are not described further herein.

The turbine rotor blades 10 are mounted on a hub 16 which is connected through a low speed coupling shaft 18 to electric generating equipment 20–32 which may include a gear box, a high speed shaft, a synchronous generator, equipment for connecting the generator to a load (such as the power grid of an electrical utility), and phase synchronizing circuitry. The electric generating equipment 20–32 provides an off/on line signal on a signal line 34 indicative of when the generator is connected on line to the utility grid.

A blade pitch angle control 36, shown generally in FIG. 3 of said patent, provides a desired or reference blade angle signal BR to an electrohydraulic pitch change mechanism 38 over a line 40. The pitch change mechanism 38 causes the blades 10 to achieve an actual blade angle (BP, in said patent) equal to the reference blade angle signal BR on the line 40.

Signals indicative of instantaneous operating parameters of the wind turbine are provided to the blade pitch angle control 36. A rotor speed transducer 46 associated with the hub 16 provides a rotor speed signal NR on a line 48. A similar transducer 50 connected to a shaft in the synchronous generator provides a generator speed signal NG on a line 52. A torque transducer 54, which may comprise strain gauges disposed on the shaft 18, or on a suitable shaft within the electric generating equipment 20–32, provides a shaft torque signal QS on a line 56. The shaft torque signal on the line 56 may alternatively be provided in any other suitable way, such as by sensing relative position of axially displaced points on the periphery of the shaft, in a well known manner. The blade pitch angle control 36 is also provided a plurality of fixed or variable reference signals indicative of a reference idle rotor speed, limits on rotor acceleration and deceleration, and a start/stop signal indicative of when the wind turbine is to be operative or feathered and essentially stationary. These signals are described more fully with respect to FIG. 2 of said patent. A wind velocity sensor 74, disposed on the nacelle 14, provides a signal indicative of average wind velocity VW on a line 76.

When the wind turbine is not in use, the blades 10 are positioned at their maximum pitch angle (90°), so that they are feathered. Thus, the blades will exert essentially no torque on the hub 16. When the wind turbine is to be put into use, a start signal causes the idle, start-up and shutdown controls 78–94 (not so called in said patent, and described more particularly in FIGS. 4 and 5 of said patent) to gradually decrease the blade angle so as to accelerate the rotor and generator toward rated speed conditions without either blade stall or the inducing of large acceleration stresses. Once the wind turbine rotor is operating at an angular speed which relates in the desired fashion to the generated electric power frequency which is necessary, the speed can then be varied slightly until the electric generating equipment 20–32 is operating synchronously with the frequency of electric power on the utility grid to which the generator will ultimately be connected. At this point in time, control is shifted from the idle, start-up and shutdown control 78–94 to the shaft torque control 100 (described in detail with respect to FIG. 6 of said patent). And, if the wind turbine is to be shut down, control reverts to the idle, start-up and shutdown controls 78–94 so as to cause the blades to be feathered without excessive deceleration stresses. As described in said patent, the minimum blade angle rate signal BMN on line 95 is such as will cause a change in blade angle necessary to maintain a fixed rate of rotor angular acceleration during start-up, to maintain the proper angular rotational speed during idle, and to maintain a fixed rate of rotor angular deceleration during shutdown.

When the electric generating equipment 20-32 is phased synchronously with the voltage on the power grid (same frequency, amplitude and phase), the equipment is connected to the power grid and a signal appears on the line 34 to indicate that the wind turbine is on-line. The transition between on-line operation and off-line operation is effected by a mode selector 96 (described in more detail with respect to FIG. 7 in said patent) which responds to the off/on line signal 34. When that occurs, the mode selector 96 applies a shaft torque blade angle rate signal ḂQ on a line 98 (discounting the improvement of the invention which is described hereinafter) to a line 102 where it becomes the blade angle reference rate signal ḂR; but when the wind turbine is off-line, the absence of the signal on the line 34 causes the line 102 to be responsive to the minimum rate signal ḂMN on a line 95. When the wind turbine is on-line, the torque blade angle rate signal on line 98 is such as will extract maximum power from the wind turbine up to the rated power value for all wind speeds between cut in and cut out; at rated wind speeds, the signal on line 98 is varied to maintain the sensed shaft torque (or power) at the reference (rated) value.

The selected desired blade angle rate signal, the blade angle reference rate signal ḂR on line 102, is converted into the blade angle reference signal BR on the line 40 by means of an integrator 104 (described more fully with respect to FIG. 8 in said patent). The integrator 104 includes apparatus to limit the rate of change of the signal on the line 40 as well as to limit the maximum positive and negative magnitudes thereof.

The description thus far with respect to reference numbers 10-104 is descriptive of an exemplary control system of the prior art in which the present invention may be practiced. This description is a summary of that in our aforementioned patent. As described briefly hereinbefore, the adverse coupling between the primary bending mode of the support tower 12 and the wind turbine control system described thus far is alleviated by the present invention through the expedient of providing additional blade angle reference command components to cause incremental thrust variations predicted to be in phase with the velocity of the top of the tower, thereby providing additional, positive aerodynamic damping to the tower. This assists damping-out any tower oscillations induced by perturbations on the loading of the blades and the commensurate correction of blade angle, such as is caused by unpredictable wind turbulence.

Figure 2:
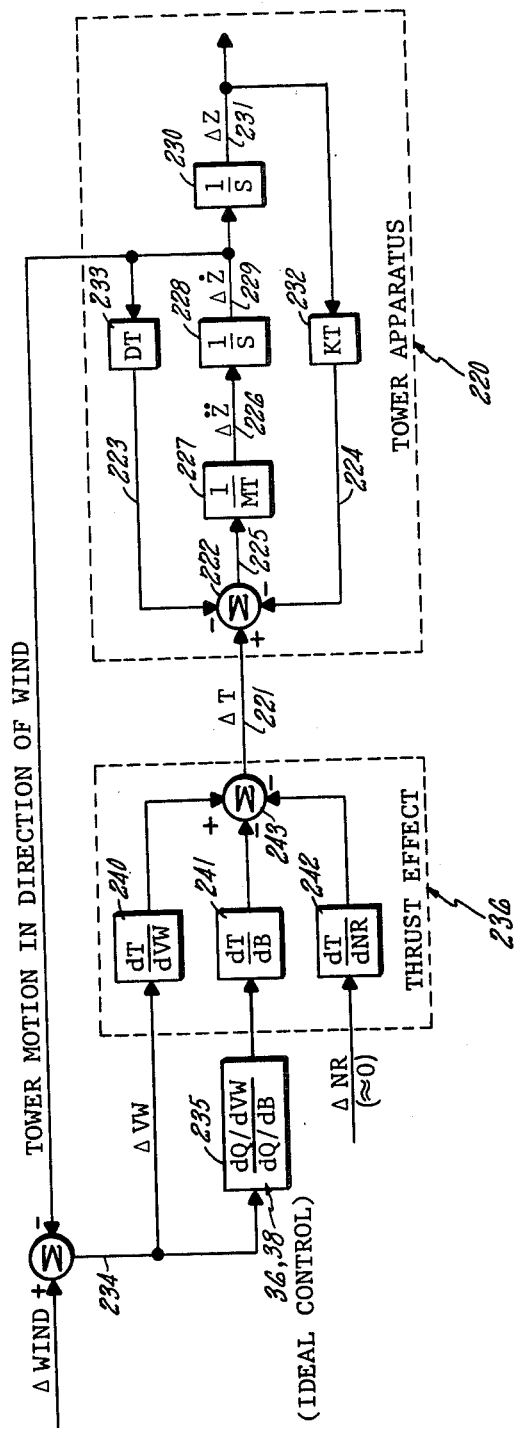
FIG. 2 is a fanciful diagram illustrating the structural characteristics of a wind turbine tower and some of the thrust effects thereon.

For a linearized analysis of the wind turbine tower/blade angle control coupling problem alluded to hereinbefore, reference is had to FIG. 2. Therein, the tower apparatus 220 represents the tower 12, nacelle 14, and all of the other apparatus disposed on the top of the tower (including the blades 10). FIG. 2 illustrates the response of the tower as a consequence of an incremental thrust (axially, parallel with the rotor hub shaft) on the blades. An incremental thrust ΔT is represented by a line 221; the effect of that thrust is reduced at 222 by the effect of damping illustrated by a line 223 and the effect of stiffness illustrated by a line 224. The net effective thrust represented by a line 225 will cause a change in acceleration represented by a line 226 in a manner related inversely to the mass 227 of the tower. The acceleration, referred to herein as $\ddot{Z}$, is in the direction of the hub axis, and of a polarity depending upon the direction of the incremental thrust ΔT. The integral 228 of the incremental acceleration 226 results in an incremental velocity $\dot{Z}$ 229.

The integration 230 of the incremental velocity 229 results in an incremental position 231 of the apparatus at the top of the tower. The incremental position 231 is representative of a change toward or away from a rest position of the tower within which the strain in the Z direction is nil. If the tower is bent so that the apparatus thereof is further away from the rest position, the stiffness is equivalent to a resistance to the thrust; this is represented by the block 232 wherein KT represents the effective stiffness of the tower.

The incremental velocity of the tower 229 is related by the effective damping ratio DT of the tower 233 to equivalent negative thrust, in a known fashion. However, the motion of the tower 229 also causes a change in relative wind velocity 234. Thus if there is an increase in wind speed, the wind will in effect blow the tower in the plus Z direction, so that the net relative wind speed on the blades themselves is less than it would be if the tower were unable to move in the Z direction. This analysis is a simplified, linearized investigation of the effect of such a wind gust on the tower, including the corrective effects provided by the control system of FIG. 1, the blade pitch angle control 36 and pitch change mechanism 38 of which are represented in an idealized fashion (in the manner described hereinafter) by the block 235.

Thrust (force on blades parallel to the rotational axis of the blades) is a function of blade angle (B), wind speed (VW), and rotor speed (NR). For small perturbations about a steady state operating point, the change in thrust (ΔT) is expressed:

$$\Delta T = \frac{dT}{dB} \Delta B + \frac{dT}{dVW} \Delta VW + \frac{dT}{dNR} \Delta NR \quad (1)$$

A similar expression for changes in rotor torque (ΔQR) is:

$$\Delta QR = \frac{dQR}{dB} \Delta B + \frac{dQR}{dVW} \Delta VW + \frac{dQR}{dNR} \Delta NR \quad (2)$$

In expressions (1) and (2), "d" denotes the partial derivative.

The effect of an electric generator feeding a large utility grid may be analogized to a motor driving an infinite flywheel at a rated speed. Because of this, and due to the fact that there is sufficient resilience in the shaft between the rotor and the generator, the wind turbine rotor speed is essentially constant (ΔNR=0). For an ideal power control (one which is able to provide complete, instantaneous blade angle adjustment for changes in power or torque), when operating above rated wind speed, the rotor torque is also constant (ΔQR=0). Therefore, from (2), $$\frac{dQR}{dB} \Delta B = -\frac{dQR}{dVW} \Delta VW \quad (3)$$

and

-continued $$\Delta B = -\frac{dQR/dVW}{dQR/dB} \Delta VW \quad (4)$$

Substituting expression (4) into expression (1), for the case where the last term ($\Delta NR$)=0, $$\Delta T = -\frac{dT}{dB} \cdot \frac{dQR/dVW}{dQR/dB} \Delta VW + \frac{dT}{dVW} \Delta VW \quad (5)$$

$$\Delta T = \left\{ \frac{dT}{dVW} - \frac{dQR/dVW}{dQR/dB} \left( \frac{dT}{dB} \right) \right\} \Delta VW \quad (6)$$

For a fixed blade angle, $\Delta B=0$, thus:

$$\frac{dT}{dB} \Delta B = 0 \quad (7)$$

so that the aerodynamic damping of the tower in such a case would simply be:

$$\frac{\Delta T}{\Delta VW} = \frac{dT}{dVW} \quad (8)$$

The aerodynamic damping of expression (8) is of the same sense as, and adds to, the positive structural damping of the tower.

On the other hand, with an actual power control in place, so that the blade angle is not fixed, the aerodynamic damping on the tower is far more complex. Considering an ideal power control, from expression (6), the total aerodynamic damping is:

$$\frac{\Delta T}{\Delta VW} = \frac{dT}{dVW} - \frac{dQR/dVW}{dQR/dB} \left( \frac{dT}{dB} \right) \quad (9)$$

Referring now to FIG. 2, expression (1) is set forth in blocks 240–243 of the thrust effect portion 236, which together with the idealized control 235 also is representative of expression (9), provided it is assumed that the change in rotor speed ($\Delta NR$) is nil. Note that a negative $\Delta T$ component (if added to $\Delta T$ at line 221, FIG. 2) would be of the same sense as and additive with the positive structural damping on line 223.

Thus FIG. 2 is an expression of the effect of the wind gust on the tower, including the tower dynamics, the effect of the wind on the blades, and the effect of the commensurate power/torque change operating through an idealized power control unit changing the blade angle as a consequence of that wind gust. Analysis of a wide variety of tower and control configurations, including the structural characteristics of the tower, the aerodynamics of the wind turbine and the control response characteristics of an idealized control, will show that the total effect of the incremental thrust as a consequence of a wind gust results in negative damping, so that the tower is unstable.

According to one embodiment of the invention, a corrective blade pitch angle reference rate signal component is summed with the torque/power controlling blade pitch angle reference rate signal BQ on the line 98 in a manner to provide additional damping to tower motion in its primary bending mode, based on an estimate of tower motion which will result from an incremental blade angle component resulting from the reaction of the torque/power control to a wind gust (e.g., 235, FIG. 2.).

Referring to FIG. 1, the blade pitch angle reference signal on the line 40 is applied to a lag filter 250, the characteristics of which approximate the effective lag of the electrohydraulic pitch change mechanism 38. This provides a filtered blade angle reference signal (BLn) on a line 251 to an amplifier 252 which has a gain equivalent to the partial derivative of torque with respect to blade angle (and therefore is representative of block 241 in FIG. 2). This provides an incremental thrust signal on a line 253 which is equivalent to the incremental thrust signal ($\Delta T$) at line 221 of FIG. 2, and is applied through a filter 254 which is a model of the control tower structure, so as to provide a corrective pitch blade angle reference rate signal component on a line 255 that results in an incremental thrust component which provides positive aerodynamic damping to the tower described with respect to FIG. 2 hereinbefore. Within the filter 254, the factors $\bar{M}, \bar{K}, \bar{D}$ are calculated, estimated equivalents of the actual mass, spring constant and damping factor of the wind turbine tower (as illustrated within the tower apparatus 220 of FIG. 2). For implementation in analog fashion, the signal line 253 feeds an amplifier which provides the functions of a summing junction 256 with a gain 257 of $1/\bar{M}$, the output of which on the line 255 is fed to an integrator 258 and thence on a line 259 to a second integrator 260. The signal on the line 259 is applied to an amplifier 261 having a gain $\bar{D}$, the output of which on a line 262 is fed to the summing junction input 256 of the amplifier. Similarly, the output of the integrator 260 on a line 263 is fed through an amplifier 264 having a gain of K, the output of which on a line 265 is also applied to the summing input 256 of the amplifier. In actual apparatus, the gain 252 is adjusted for desired effect, and usually will be higher than dT/dB; the total desired gain of the filter is referred to herein as KA. Of course, the gain 252 could be provided within the lag filter 250, in the well known, usual fashion; the separate illustration thereof in FIG. 1 is to clarify the function being performed.

The total filter, including the tower model 254 in conjunction with the lag filter 250 and the gain 252 illustrated in FIG. 1 has the following transfer function:

$$\frac{(KA)S^2}{\bar{K}\{(TA)S + 1\}\{(\bar{M}/\bar{K})S^2 + (\bar{D}/\bar{K})S + 1\}} \quad (10)$$

where KA is the total gain which may be adjusted to provide the degree of tower damping desired. In fact, the invention may be practiced simply by applying a lagged version of the blade angle reference signal BR on the line 40 to any signal processing means which can provide the transfer function of expression (10). For instance, in a wind turbine blade pitch angle control system which is implemented utilizing a suitably programmed computer, the addition to the computer program required to add the present invention to a programmed computer version of the control system of the aforementioned patent may be as set forth hereinbelow.

Filter Program
1. Skip to end if not on line
2. BLn=BLm+TA(BR−BLm)
3. BLm=BLn
4. $\Delta T$=dT/dB*BLn (or $\Delta T$=KA*BLn)
5. =$\Delta \bar{T}+\bar{D}*\dot{Z}m+\bar{K}*Zm$ 6. $\ddot{Z}n = \overline{T}/\overline{M}$
7. $\dot{Z}n = k1 * \ddot{Z}n + \dot{Z}m$
8. $Zn = k2 * \dot{Z}n + Zm$
9. $\dot{Z}m = \dot{Z}n$
10. $\ddot{Z}m = \ddot{Z}n$
11. $BQ'n = BQn + \ddot{Z}n$
12. End The first step of the filter program simply bypasses the program whenever the wind turbine is not on line (that is to say, there is no discrete flag equivalent to the signal on the line 34 indicating that the system is on line). The second step of the program provides the filtered blade angle reference signal by a well known leg algorithm, in which TA is an equivalent of the time constant of the filter 250 in FIG. 1, as related to the cycle time of the computer (which may be on the order of 50 ms or so). In the program, "n" denotes the corresponding value for the current cycle, whereas "m" denotes the related value in the next preceding cycle. The third step of the program simply updates the value of the filtered blade angle reference signal for use in the subsequent cycle. The fourth step of the program provides the gain of the amplifier 252 in FIG. 1 (or the overall desired gain KA). The fifth step of the program provides the summation of the summing input 256; note that as is true in any computer implementation of a feedback system, the feedback value can only be generated with component values provided in the next prior cycle: since these values change only slightly in a computer cycle time, this does not affect overall performance in any measurable way. Step six provides the gain of the amplifier 257, and step seven provides the integration 258, where the value k1 is a time constant equivalent for the cycle time of the computer, in the well known fashion. Similarly, step eight provides the integration 260 of FIG. 1. Steps nine and ten update the values of the motion and distance factors for use in a subsequent cycle. Step eleven provides a summation equivalent to the summing junction 266 in FIG. 1, and step twelve indicates the end of operation (return to other parts of the program), in a well known fashion. In a typical case, the provision of the blade angle reference signal (line 40, FIG. 1) may be preferred to be accommodated in a digital computer which can perform significant self-health monitoring, failure mode correction, and shut down control. In such a case, the present invention may preferably be implemented by the foregoing filter program within such digital computer. In a case where an analog system (generally of the type shown in FIG. 1) is employed to generate the blade angle reference signal, an analog apparatus capable of implementing the transfer function of expression (10) hereinbefore, whether of the type shown in FIG. 1 or otherwise, may be employed. Or, dedicated digital apparatus of a suitable type may be utilized wherever appropriate. All of this may be provided well within the skill of the art utilizing apparatus and techniques which are readily available, in the light of the foregoing teachings.

Another way to view the present invention is that it provides a predicted estimate of incremental tower motion thay may result as a consequence of a change in blade angle. As such, it is a coarse, analytical version of the solution disclosed in our commonly owned, copending U.S. patent application Ser. No. 364,706, filed contemporaneously herewith, now and U.S. Pat. No. 4,420,692, entitled MOTION RESPONSIVE WIND TURBINE TOWER DAMPING. Thus, the $\ddot{Z}$ signal, on line 255 or in step 6, can be considered a predicted acceleration signal generated by filtering of the blade pitch angle reference signal with the transfer function of expression (10) hereinbefore.

Note that the integration (104) of the summation on line 98a of the torque/power modulation component on line 98 and the damping component on line 255 results in a blade angle reference signal component for damping which is a function of velocity ($\dot{Z}$). Therefore, the predicted velocity signal on line 259 could be summed with the output of the integrator 104 instead of summing the predicted acceleration signal with the blade pitch angle reference rate before the integrator 104. In either case, the relationship of the damping signal component to blade pitch angle reference signal is that of expression (10) hereinbefore, but with S rather than $S^2$ in the numerator. The invention may be used in the off-line mode as well, if desired. The significant factor is that the predicted motion provides a blade pitch angle component that results in a thrust component for positive aerodynamic damping.

Similarly, although the invention has been shown and described with respect to exemplary embodiments thereof, it should be understood by those skilled in the art that the foregoing and various other changes, omissions and additions may be made therein and thereto, without departing from the spirit and the scope of the invention.

We claim:
1. A wind turbine system for generating electric power, comprising:
   a tower;
   a rotor disposed on said tower including blades disposed for rotation about an axis and a blade pitch angle change mechanism;
   means for providing an actual torque/power signal indicative of actual torque/power generated by said wind turbine system; and
   signal processing means for providing a reference torque/power signal indicative of desired generated torque/power, and for providing a blade pitch angle reference signal as a function of the difference between said actual torque/power signal and said reference torque/power signal;
   characterized by:
   said signal processing comprising means for providing said blade pitch angle reference signal as a combination of a damping signal component related to a filtered function of said blade pitch angle reference signal and a torque/power control signal component which is said function of the difference between said actual torque/power signal and said reference torque/power signal.

2. A wind turbine system according to claim 1 characterized by said signal processing means comprising means for providing said damping signal component by filtering said blade pitch angle reference signal with the transfer function $$\frac{(KA)S}{\overline{K}\{(TA) + 1\}\{(\overline{M}/\overline{K})S^2 + (\overline{D}/\overline{K})S + 1\}},$$

where S is the LaPlacian Operator, TA is a time constant approximating the lag of said pitch change mechanism in responding to said blade pitch angle reference signal, and $\overline{K}$, $\overline{M}$ and $\overline{D}$ approximate the stiffness, mass and damping constant, respectively, of said tower and the apparatus disposed thereon, and for providing said torque/power control signal component as the integral function of the difference between said actual torque/power signal and said reference torque/power signal.

3. A wind turbine system according to claim 1 characterized by said signal processing means comprising means for providing a predicted tower motion signal by filtering said blade pitch angle reference signal with the transfer function $$\frac{(KA)S^2}{\overline{K}\{(TA) + 1\}\{(\overline{M}/\overline{K})S^2 + (\overline{D}/\overline{K})S + 1\}},$$

where S is the LaPlacian operator, TA is a time constant approximating the lag of said pitch change mechanism in responding to said blade pitch angle reference signal, and K, M and D approximate the stiffness, mass and damping constant, respectively, of said tower and the apparatus disposed thereon, for providing a blade pitch angle reference rate signal as the summation of said predicted tower motion signal with a signal indicative of the difference between said actual torque/power signal and said reference torque/power signal, and for providing said blade pitch angle reference signal as an integral function of said pitch blade angle reference rate signal.

* * * * *

UNITED STATES PATENT AND TRADEMARK OFFICE
CERTIFICATE OF CORRECTION

PATENT NO. : 4,435,647

DATED : March 6, 1984

INVENTOR(S) : Kermit I. Harner, John P. Patrick, Joseph M. Kos

It is certified that error appears in the above-identified patent and that said Letters Patent is hereby corrected as shown below:

Col. 2, line 45, "and" should read -- the --.

Col. 8, line 33, "K" should read -- $\bar{K}$ --.

Col. 8, line 66, "$\dot{B}Ln$" should read -- $\dot{B}Ln$ --.

Col. 8, line 68, "Before the = sign, insert -- $\bar{T}$ --.

Col. 8, line 68, "$\Delta \bar{T}$" should read -- $\Delta T$ --.

Col. 9, line 5, "$\dot{Z}m = \dot{Z}n$" should read -- $Zm = Zn$ --.

Col. 9, line 14, "leg" should read -- lag --.

Col. 12, line 4, "K, M and D" should read -- $\bar{K}, \bar{M}$ and $\bar{D}$ --.

Signed and Sealed this

Fourth Day of June 1985

[SEAL]

Attest:

DONALD J. QUIGG

Attesting Officer     Acting Commissioner of Patents and Trademarks